(12) United States Patent
Nakada et al.

(10) Patent No.: US 6,942,346 B2
(45) Date of Patent: Sep. 13, 2005

(54) ILLUMINATING OPTICAL SYSTEM AND COLOR IMAGE PROJECTING DEVICE

(75) Inventors: Takeki Nakada, Sano (JP); Kumajiro Sekine, Sano (JP)

(73) Assignee: Sekinos Co., Ltd. (JP)

( * ) Notice: Subject to any disclaimer, the term of this patent is extended or adjusted under 35 U.S.C. 154(b) by 42 days.

(21) Appl. No.: 10/413,581

(22) Filed: Apr. 15, 2003

(65) Prior Publication Data

US 2004/0207817 A1 Oct. 21, 2004

(51) Int. Cl.$^7$ ............................................. G03B 21/14
(52) U.S. Cl. .............................. 353/31; 353/34; 349/5; 359/638
(58) Field of Search .............................. 353/20, 31, 33, 353/34, 37, 81; 349/5, 8, 9; 359/634, 629, 638

(56) References Cited

U.S. PATENT DOCUMENTS

| | | | | |
|---|---|---|---|---|
| 4,850,685 A | * | 7/1989 | Kamakura et al. | ......... 359/634 |
| 5,864,374 A | * | 1/1999 | Ito et al. | ...................... 348/757 |
| 6,171,421 B1 | | 1/2001 | Murata et al. | ................ 156/99 |
| 6,549,248 B1 | * | 4/2003 | Miyazawa et al. | ............. 349/9 |

* cited by examiner

Primary Examiner—William C. Dowling
(74) Attorney, Agent, or Firm—Lorusso & Loud

(57) ABSTRACT

A color image projecting device includes an illuminating optical system and a projection optical system. The illuminating optical system includes a light source emitting white light including red, green, and blue colors, a dividing-spectra block having reflecting surfaces reflecting the red and blue colors of the light received from the light source toward left and right while transmitting the green color, a red block having a dichroic mirror provided in contact with the dividing-spectra block and reflecting the red color, reflected off the reflecting surface of the dividing spectra block, toward the projection optical system, a blue color block having a dichroic mirror like that of the red block, and a green block having a dichroic mirror reflecting the transmitted green color of light toward the projection optical system.

7 Claims, 5 Drawing Sheets

ILLUMINATING OPTICAL SYSTEM AND COLOR IMAGE PROJECTING DEVICE

BACKGROUND OF THE INVENTION

1. Field of the Invention

The present invention relates to an illuminating optical system for splitting white light into red, green, and blue colors and to a color image projecting device for projecting a color image onto a screen, for example, using each color of light from the illuminating optical system.

2. The Prior Art

Color image projecting devices are generally known which split white light into colors, transmit each of the colors of light through picture elements, and then integrate the colors of light into one in order to project it onto a screen and so forth. FIG. 2 shows one example of a prior art color image projecting device as including a light source 2, an illuminating optical system 3, and a projection optical system 4.

The light source 2 comprises a lamp 5 that emits the white light, two integrators 6 and 7, a PS conversion element 8 provided between the integrators 6 and 7. White light that is polarized to P polarized light and S polarized light is output from the light source 2.

The illuminating optical system 3 comprises a total reflection mirror 11, a first dichroic mirror 12, a second dichroic mirror 13, a third dichroic mirror 14, and relay lenses 15, 16, and 17. Each of mirrors and lenses is precisely positioned in an optical path. The total reflection mirror 11 totally reflects the white light from the light source 2 toward the first dichroic mirror 12. The first dichroic mirror 12 transmits only the red color of light while reflecting the remaining green and blue colors of light. The second dichroic mirror 13 transmits only the blue color of light reflected off the first dichroic mirror 12 while reflecting the remaining green color of light. The third dichroic mirror 14 reflects the red color of light transmitted through the first dichroic mirror 12. Each relay lens 15, 16, and 17 adjusts a respective optical path of each of the red, green, and blue colors of light separated by each dichroic mirror 13 and 14, whereby the light paths are incident, respectively, on each of a red block 18, a green block 19, and a blue block 20 as described below.

The projection optical system 4 comprises the red block 18, the green block 19, the blue block 20, a condensing block 21, and a projection lens 22. The red block 18 forms a red projection image with the red color light separated by the illuminating optical system 3, the green block 19 forms a green projection image with the green color light separated by the illuminating optical system 3, and the blue block 20 forms a blue projection image with the blue color light separated by the illuminating optical system 3. The condensing block 21 integrates the projection images formed by the red block 18, the green block 19, and the blue block 20 into one projection image. The projection lens 22 projects the projection image integrated by the condensing block 21 onto the screen.

However, in the color image projecting device 1 described above, each mirror 11, 12, 13, and 14 and each lens 15, 16, and 17 is a discrete component and together represent a large number of components. Furthermore, the positioning of these components precisely on the optical path requires a large number of complex assembly steps, resulting in problems such as increased production cost.

SUMMARY OF THE INVENTION

The present invention takes into consideration the above problems and the object of the invention is to provide an illuminating optical system and a color image projecting device which can be assembled with improved efficiency and lower production cost reduction by reducing the number of components and assembly steps.

In order to solve the above problems, an illuminating optical system of a first embodiment comprises a light source that emits white light including red, green, and blue colors and a dividing-spectra block facing the light source. The dividing-spectra block has at least a first reflecting surface that is provided in an optical path from said light source and reflects one of three colors of light while transmitting the remaining colors of light, a second reflecting surface for extraction of light reflected off the first reflecting surface by reflection in a predetermined direction, a third reflecting surface that is provided in the optical path from said light source and reflects another one of said three colors of light while transmitting a remaining color of light, and a fourth reflecting surface for extraction of light reflected off the third reflecting surface by reflection in a predetermined direction.

In accordance with the above-described configuration, the first reflecting surface of the dividing-spectra block directs one of the three colors of light toward the second reflecting surface. The second reflecting surface extracts the light from the first reflecting surface by reflection in the predetermined direction. The third reflecting surface directs one of the remaining two colors of light toward the fourth reflecting surface by reflection while transmitting the remaining one color of light. The fourth reflecting surface extracts light from the third reflecting surface by reflection in the predetermined direction. The light that is not reflected off the first and the third reflecting surfaces, but is transmitted through them, is directly extracted in the predetermined direction or extracted in the predetermined direction by providing a fifth reflecting surface for extraction. Therefore, the three colors of light from the white light are extracted by separating them in the predetermined direction.

An illuminating optical system according to a second embodiment comprises a light source that emits white light including red, green, and blue colors, a first block that has at least a first reflecting surface which reflects or transmits one of the three colors of light from the light source in a predetermined direction while transmitting or reflecting the remaining colors of light, and a second block in contact with the first block and having at least a second reflecting surface which reflects or transmits one of the two colors of light transmitted through or reflected off said first reflecting surface in a predetermined direction, while transmitting or reflecting the remaining color of light.

In accordance with the second embodiment, the white light output from the light source is input to the first block, whereby one of the red, green, and blue colors of light is extracted by reflection or transmission in the predetermined direction. The remaining colors of light are input to the second block in contact with the first block. In the second block, one of the two input colors of light is extracted by reflection or transmission in the predetermined direction while the remaining color of light is extracted by transmission or reflection in the predetermined direction. Therefore, the three colors of light are extracted by separating them in the predetermined direction.

The illuminating optical system of the second embodiment is preferably provided with a third block in contact with the second block and has a third reflecting surface which reflects light transmitted through or reflected off the second reflecting surface of the second block in a predetermined direction.

In accordance with the above-described second embodiment, the first block extracts one of the three colors of light included in the white light emitted from the light source in the predetermined direction and the second block extracts one of the two remaining colors of light in the predetermined direction. The remaining color of light is input to the third block in contact with the second block. The third block extracts the light input from the second block by reflection at its third reflecting surface in the predetermined direction. Therefore, the three colors of light are extracted by separating them in the predetermined direction.

An illuminating optical system of a third embodiment comprises a light source that emits white light including red, green and blue colors and a dividing-spectra block having a first reflecting surface that reflects one of the three colors of light from the light source while transmitting the remaining colors of light and a second reflecting surface that reflects another color of light while transmitting a remaining color of light. The first and second reflecting surfaces are provided on the same optical path in order to split the three colors of light in three directions. A red block is provided in contact with a surface of the dividing-spectra block from which a red color of light is output and has a third reflecting surface for extraction of the red light by reflection in a predetermined direction. A green block is provided in contact with a surface of said dividing-spectra block from which a green color of light is emitted and has a fourth reflecting surface for extraction of the green light by reflection in a predetermined direction. Likewise, a blue block is provided in contact with a surface of the dividing-spectra block from which a blue color of light is emitted and has a fifth reflecting surface for extraction of the blue light by reflection in a predetermined direction.

In accordance with the above-described third embodiment, the white light emitted from the light source is input to the dividing-spectra block. In the dividing-spectra block, one of the three colors of light included in the white light is reflected off the first reflecting surface, one of the remaining two colors of light is reflected off the second reflecting surface, and the remaining one color of light is transmitted through the first and the second reflecting surfaces. The red block, in contact with the surface of the dividing-spectra block from which the red color of light is output, extracts the input red color of light by reflection in the predetermined direction with the third reflecting surface for extraction. The green block, in contact with the surface of the dividing-spectra block from which the green color of light is output, extracts the input green color of light by reflection in the predetermined direction with the fourth reflecting surface. The blue block, in contact with the surface of the dividing-spectra block from which the blue color of light is output, extracts the input blue light by reflection in the predetermined direction with the fifth reflecting surface. Therefore, the three colors of light are extracted by splitting in the predetermined direction.

The illuminating optical system of each of the embodiments has each of reflecting surfaces formed of a dichroic mirror which reflects or transmits only one of the red, green, and blue colors of light.

In accordance with the above-described configuration, only one of three colors of light can be reliably extracted by reflection with the dichroic mirror.

The illuminating optical system of each of the embodiments has each of the blocks formed of transparent plastic.

In accordance with the above-described configuration, assembly of the illuminating optical system is easy and precise without requiring fine adjustment of an optical axis for each reflecting surface and can be achieved by forming each block of transparent plastic and adhering one to the other.

A color image projecting device of a fourth embodiment combines an illuminating optical system that outputs red, green, and blue colors by separating the white light and a projection optical system that forms a color projection image with the three colors of light from the illuminating optical system wherein the color image projecting device may be any of the illuminating optical systems of the previously described embodiments.

BEST MODE OF THE PREFERRED EMBODIMENT

Hereinafter, preferred embodiments of an illuminating optical system and a color image projecting device of the present invention are described with reference to the drawings.

Figure 1:
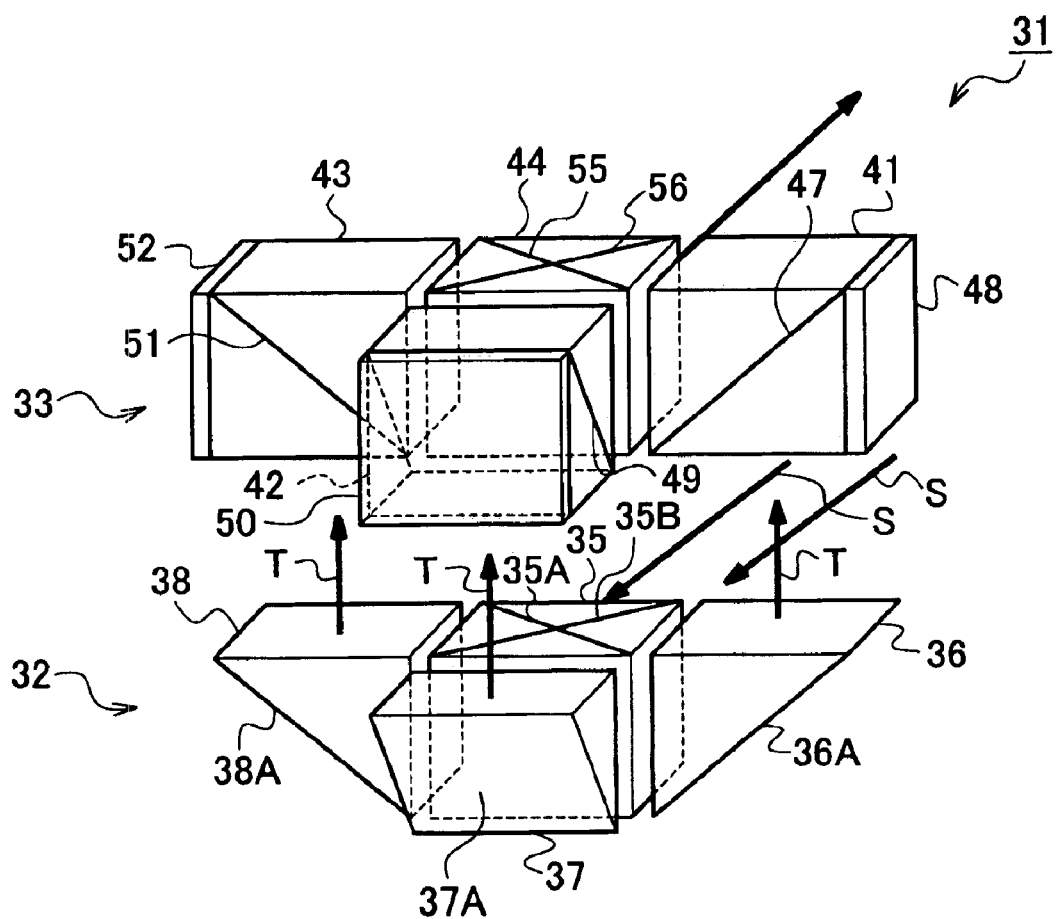
FIG. 1 is an exploded perspective view of a color image projecting device of a first embodiment.

First, the color image projecting device of a first embodiment will be described with reference to FIG. 1.

The color image projecting device 31 of this first embodiment comprises a light source (not shown), an illuminating optical system 32, and a projection optical system 33.

Figure 2:
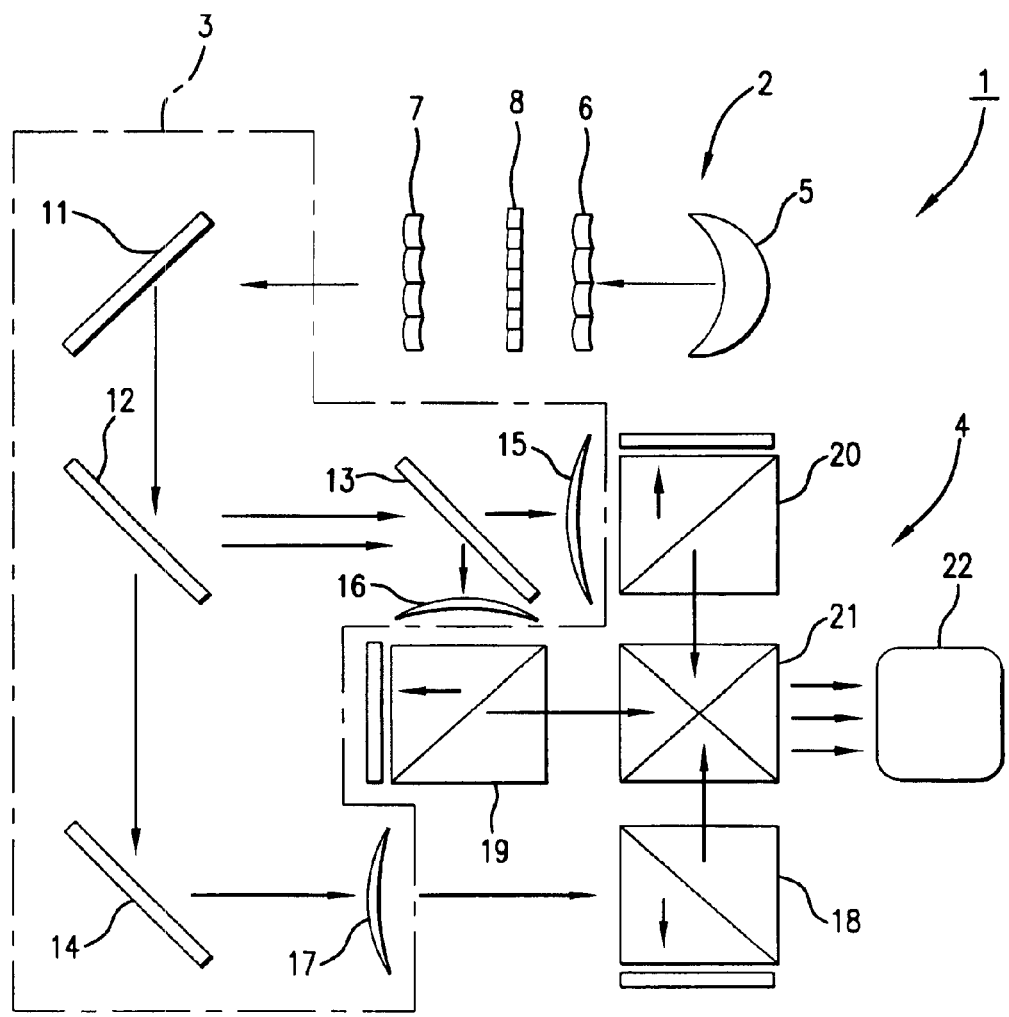
FIG. 2 is a schematic view of a prior art color image projecting device.

Like the prior art light source 2 shown in FIG. 2, the light source used in the present invention outputs white light in which red, green, and blue colors of light are included. The white light from the light source is input to the illuminating optical system 32.

The illuminating optical system 32 comprises a dividing-spectra block 35, a red block 36, a green block 37, and a blue block 38.

The dividing-spectra block 35 is a block for extracting three colors of light, namely the red, green, and blue colors of light, from the white light by dispersion. The dividing-spectra block 35 is formed in the shape of a regular hexahedron of a transparent synthetic resin such as an olefin, acrylic, or polycarbonate. Two reflecting surfaces 35A and 35B are provided in the dividing-spectra block 35. The reflecting surfaces 35A and 35B are vertically oriented and intersect each other at right angles along diagonal lines. The first reflecting surface 35A is a dichroic mirror which reflects the red color light, included in the inputted white light, in a direction orthogonal to optical path S, while transmitting the remaining colors of light. The second reflecting surface 35B is a dichroic mirror which reflects blue color light, included in the white light, in a direction orthogonal to the optical path S and opposite the direction in which the red color light is reflected, while transmitting a remaining color of light. Therefore, the red color light included in the white light, which is incident along the optical path S, is reflected in the orthogonal direction by the first reflecting surface 35A, the blue color light is reflected in the direction opposite to the direction in which the red color of light is reflected by the second reflecting surface 35B, and green color light is transmitted through the dividing-spectra block 35, whereby three colors of light are dispersed in three directions.

The red block 36 outputs the red color light to the projection optical system 33 and is formed in the shape of a triangular prism of a transparent synthetic resin such as olefin, acrylic, or polycarbonate. More specifically, the red block 36 is formed in the shape of the triangular prism obtained by dividing a regular hexahedron into halves along a diagonal line. A dichroic mirror 36A for reflecting the red color of light is provided on the inclined surface of the red block 36 and reflects the red color light from the dividing-spectra block 35 in the projection direction T. The dichroic mirror 36A may be formed directly on the inclined surface of the red block 36 by deposition or adhered thereto as a plate. The refractive index of the interface must be accounted for when a plate is adhered. In addition, a total reflection mirror formed by aluminum deposition or otherwise may be provided on the inclined surface of the red block 36 because the first reflecting surface 35A of the dividing-spectra block 35 extracts only the red color of light. The red block 36 is integrally adhered to the surface of the dividing-spectra block 35 which outputs the red color light.

The green block 37 is a block for outputting the green color light to the projection optical system 33. The green block 37, like the red block 36, is formed in the shape of a triangular prism made of a transparent synthetic resin such as olefin, acrylic, or polycarbonate. A dichroic mirror 37A for reflecting the green color light is provided on the inclined surface of the green block 37 and reflects the green color of light included in the light from the dividing-spectra block 35 in the projection direction T. In the dividing-spectra block 35, the light which is transmitted through the first reflecting surface 35A and the second reflecting surface 35B is input to the green block 37 and the dichroic mirror 37A is used because the light from which the red and blue colors of light have been extracted may still include light other than the green color light. The dichroic mirror 37A may be formed by deposition or adhered as a plate. Again, the refractive index of the interface must be accounted for when a plate is adhered. The green block 37 is integrally adhered to the surface of the dividing-spectra block 35 which outputs the green color light.

The blue block 38 outputs the blue color light to the projection optical system 33. The blue block 38, like red color block 36, is formed in the shape of a triangular prism and fabricated of transparent synthetic resins such as olefin, acrylic, or polycarbonate. A dichroic mirror 38A for reflecting the blue color of light is provided on the inclined surface of the blue color block 38 for reflecting the blue color light from the dividing-spectra block 35 in the projection direction T. The dichroic mirror 38A may be formed by deposition or adhered as a plate. Again, the refractive index of the interface must be accounted for when in the form of a plate. In addition, a total reflection mirror formed by aluminum deposition or otherwise may be provided on the inclined surface of the blue block 38 because the second reflecting surface 35B of the dividing-spectra block 35 emits only the blue color light. The blue block 38 is integrally adhered to the surface of the dividing-spectra block 35 which emits blue color light.

Figure 3:
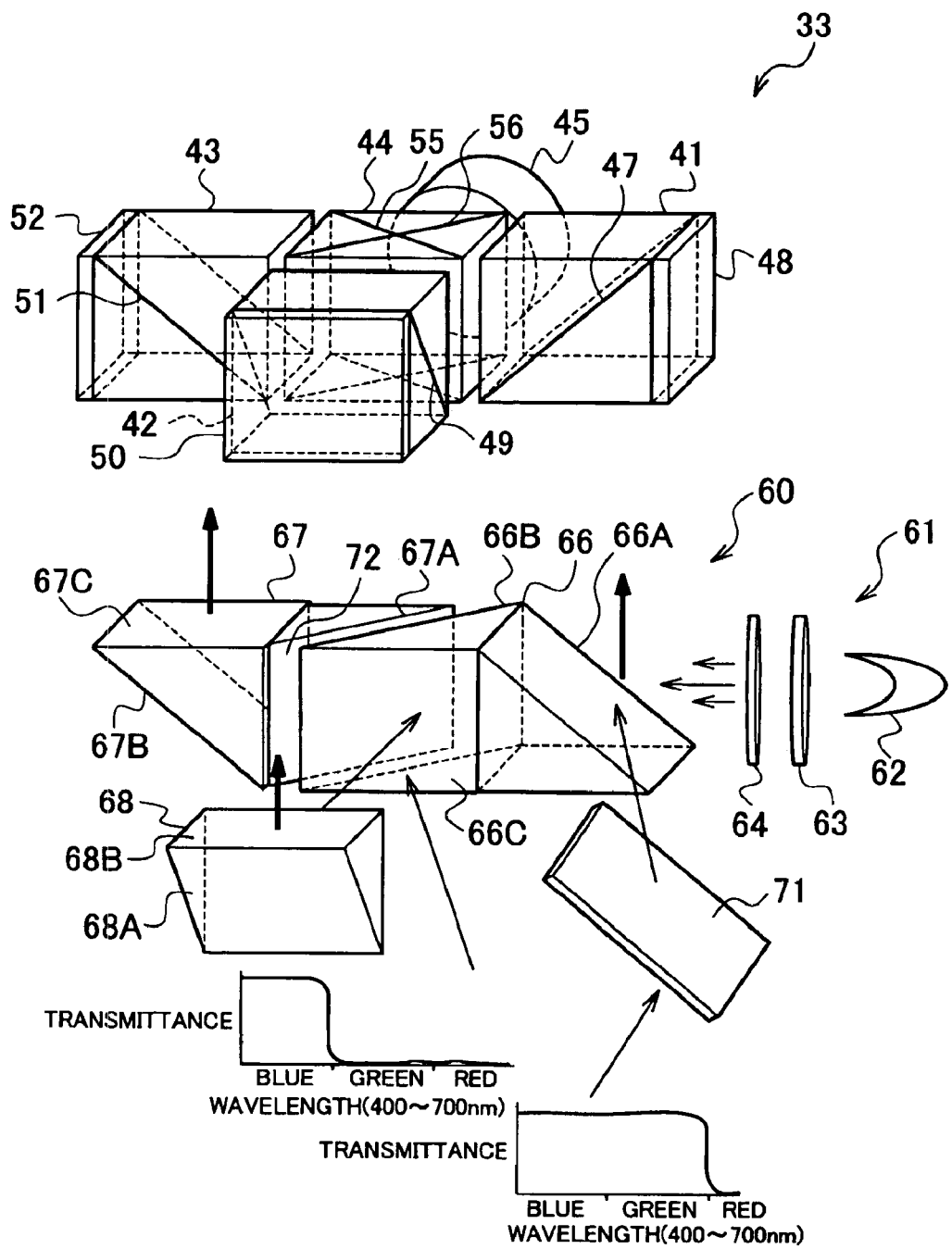
FIG. 3 is an exploded perspective view of the color image projecting device of a second embodiment.

The projection optical system 33 comprises a red projection block 41, a green projection block 42, a blue projection block 43, a condensing block 44, and a projection lens 45 (Refer to FIG. 3).

The red projection block 41 is a block for producing a red projection image with the red color light. The red projection block 41 is adhered to the surface of the red block 36 of the illuminating optical system 32 which emits the red color light. The red projection block 41 is formed in the shape of a regular hexahedron, and a PBS plate 47 and a red panel 48 are provided therein. PBS plate 47 is provided along a diagonal of the red projection block 41 and is inclined at an angle of 45 degrees to the optical path of light output from the red block 36. Either of P polarized light or S polarized light is transmitted through the PBS plate 47 while the other is reflected. Therefore, the red color light input from the red block 36 of the illuminating optical system 32 is reflected and guided to the red panel 48 while the red color light has its plane of polarization rotated by 90 degrees, and from the red panel 48 is transmitted (output) to the condensing block 44. The red panel 48 is provided with red picture elements such as liquid crystal for producing an image by selectively reflecting the red color light. The plane of polarization of the red light reflected off the PBS plate 48 is rotated by 90 degrees. The red panel 48 is attached to an outer end face of the red projection block 41.

The green projection block 42 converts the green color light into a green projection image. The green projection block 42 is adhered to the green color emitting surface of the green block 37 in the illuminating optical system 32. The green projection block is formed in the shape of the regular hexahedron, and a PBS plate 49 and a green panel 50 are provided therein. A PBS plate 49 receives the green color light from the green block 37 in the illuminating optical system 32, and reflects it to the green panel 50 which is attached to an outer end face of the green projection block 42. The green color light has its plane of polarization rotated by 90 degrees by the green panel 50 and is redirected to the condensing block 44. The green panel 50 is provided with green picture elements such as liquid crystal for producing an image by selectively reflecting the green color light toward the condensing block 44.

The blue projection block 43 converts the blue color light into a blue projection image and is adhered to the blue color light emitting surface of the blue block 38 in the illuminating optical system 32. The blue projection block 43 is formed in the shape of a regular hexahedron, has a PBS plate 51 provided diagonally therein, and has a blue color panel 52 attached to an outer end face. The PBS plate 51 receives the blue color light from the blue block 38 in the illuminating optical system 32, and reflects it to the blue panel 52 where the plane of polarization of the blue color light is rotated by 90 degrees and is redirected to the condensing block 44. The blue panel 52 is provided with blue color picture elements for producing an image by selectively reflecting the blue color light.

The condensing block 44 integrates the red color light from the red projection block 41, the green color light from the green projection block 42, and the blue color light from the blue projection block 43. Two reflecting plates 55 and 56 are arranged vertically and intersecting each other at right angles along diagonal lines within the condensing block 44.

A first reflecting plate 55 receives the red color light from the red projection block 41 and reflects the red color light toward a projection lens 45 while transmitting the other colors of light. A second reflecting plate 56 reflects the blue color light input from the blue projection block 43 toward the projection lens 45 while transmitting the other colors of light. In addition, each of the reflecting plates 55 and 56 transmits the green color of light input from the green projection block 42 toward the projection lens 45 without reflecting it. Therefore, three colors of light are integrated by the condensing block 44 and output to the projection lens 45.

The condensing block 44 has the red projection block 41 adhered to an input surface for the red color light, the green projection block 42 adhered to an input surface for the green color light, and the blue projection block 43 adhered to an input surface for the blue color light. In addition, the condensing block 44 is also adhered to the dividing-spectra block 35 of the illuminating optical system 32.

The projection lens 45 projects light output from the condensing block 44 to a projection surface such as a screen or the like. The projection lens 45 is provided facing an output surface of the condensing block 44.

The illuminating optical system 32 of the color image projecting device 31 is assembled in the following manner. The red block 36, the green block 37, and the blue block 38 are respectively adhered to the dividing-spectra block 35. Moreover, in the projection optical system 33, the red projection block 41, the green projection block 42, and the blue projection block 43 are respectively adhered to the condensing block 44. Then, the dividing-spectra block 35, the red block 36, the green block 37, and the blue block 38 of the illuminating optical system 32 are respectively adhered to the condensing block 44, the red projection block 41, the green projection block 42, and the blue projection block 43 of the projection optical system 33, whereby an entire unit is assembled.

In the color image projecting device 31 assembled as described above, the white light from the light source is separated by the dividing-spectra block 35 into the three colors of light (red, green, and blue) which are input, respectively, to the red block 36, the green block 37, and the blue block 38. The dichroic mirrors 36A, 37A, and 38A of the red block 36, the green block 37, and the blue block 38 reflect the respective light colors to the projection optical system 33.

In the projection optical system 33, each of the red, green, and blue color lights, respectively received from the red block 36, the green block 37, and the blue block 38 of the illuminating optical system 32, are respectfully input to the red projection block 41, the green projection block 42, and the blue projection block 43, wherein each of the different color projection images are formed and then each of the images is input to the condensing block 44 to be integrated and projected via the projection lens 45 onto a screen or the like.

Reduction of the number of components and assembly steps can be achieved because the illuminating optical system 32 and the projection optical system 33 are each composed of blocks and the entire unit is assembled simply by adhering blocks one to the other as described above.

Since positioning or fine adjusting of respective components onto an optical axis is not necessary, assembly of the color image projecting device 31 is performed very easily and assembly efficiency is greatly improved. Furthermore, the number of components is decreased and the production cost is reduced.

A second embodiment of the present invention will now be described with reference to FIG. 3. Since the projection optical system of the color image projecting device of this second embodiment has the same configuration as that of the projection optical system 33 of the first embodiment, identical numbers are assigned to identical elements to abbreviate the description. The second embodiment is characterized by an illuminating optical system 60 in which a light source 61 comprises a lamp 62, an integrator 63, and an IR cut filter 64.

The illuminating optical system 60 of the second embodiment comprises a first block 66, a second block 67, and a third block 68.

The first block 66 reflects one of the three colors of light in a predetermined direction while transmitting the remaining colors of light. The first block 66 comprises two triangular prisms, each obtained by dividing a regular hexahedron into halves along a diagonal line, each of which is turned 90 degrees and the two halves are united together. The first block 66 has a first inclined surface 66A on the side of the light source 61 facing upward and a second inclined surface 66B on the opposite side facing sideways. The first inclined surface 66A is a reflecting surface. A dichroic mirror 71 is adhered to the first inclined surface 66A for reflecting the red color light as shown in graph of FIG. 3. Alternatively, the dichroic mirror 71 may be formed on the first inclined surface 66A by deposition. The dichroic mirror 71 reflects the red color of light upward while transmitting the remaining colors of light. The red color light reflected off the first inclined surface 66A is input to the red projection block 41 of the projection optical system 33. The second inclined surface 66B is united with a first inclined surface 67A of the second block 67 to form a reflecting surface. A vertical surface 66C, opposed to the second inclined surface 66B, serves as an output surface for the green color light that is reflected off the second inclined surface 66B (the first inclined surface 67A).

The second block 67 reflects one of the remaining two colors of light received from the first block 66 in a predetermined direction while transmitting the remaining one color of light in a predetermined direction. Like the first block 66, the second block 67 comprises two triangular prisms, each obtained by dividing a regular hexahedron into halves along a diagonal. Each of these halves is turned 90 degrees to one another and the two are united with each other. In addition, a triangular prism provided in contact with the first block 66 is formed slightly smaller than the other triangular prism here to adjust for the thickness of diachronic mirror 72. The first inclined surface 67A on the side of the first block 66 faces sideways (horizontally) and a second inclined surface 67B on the opposite side faces downward. The first inclined surface 67A is a reflecting surface formed by adhering to it dichroic mirror 72 for reflecting the green color of light as shown in graph of FIG. 3. Alternatively, the dichroic mirror 72 may be formed on the first inclined surface 67A by deposition. The dichroic mirror 72 reflects the green color light sideways while transmitting the remaining color of light. Although the red color light can also be reflected off, only the green color light is reflected because the red color of light has already been removed by dichroic mirror 71. The second inclined surface 67B is a reflecting surface for reflecting the blue color of light. When the light that is directed onto the second inclined surface 67B is only the blue color light, the second inclined surface 67B may be a total reflection mirror formed by aluminum deposition or the like. When light other than the blue color light is included, a dichroic mirror for reflecting only the blue color of light is provided. A horizontal surface 67C opposing to the second inclined surface 67B is an output surface which emits the blue color light reflected off the second inclined surface 67B. The blue color light output from the horizontal surface 67C is input to the blue projection block 43 of the projection optical system 33.

The third block 68 serves to reflect the green color light reflected off the second inclined surface 66B of the first block 66 (the first inclined surface 67A of the second block 67) and is output from the vertical surface 66C in a predetermined direction. The third block 68 is formed in the shape of two triangular prisms obtained by dividing a regular hexahedron into halves along a diagonal. A total reflection mirror is provided on an inclined surface 68A of the third block 68. A dichroic mirror that reflects the green color light may be utilized instead of the total reflection mirror. A horizontal surface 68B opposing the inclined surface 68A is an output surface which emits the green color light reflected off the inclined surface 68A. The green color light output from horizontal surface 68B is input to the green projection block 42 of the projection optical system 33.

In the illuminating optical system 60 of the color image projecting device as comprised above, the first block 66, the second block 67, the third block 68, and the dichroic mirrors 71 and 72 are respectively adhered to one another. Then, the horizontal surface 67C of the second block 67 is adhered to the blue projection block 43 of the projection optical system 33 and the horizontal surface 68B of the third block 68 is adhered to the green color projection block 42 of the projection optical system 33, whereby the unit is completely assembled.

In the illuminating optical system 60, the white light from the light source is separated into three colors of light (red, green, and blue) by the dichroic mirrors 71 and 72 for input to the projection optical system 33.

In the projection optical system 33, the projection image is projected onto a screen as in the first embodiment.

Reduction of the number of components and assembly steps in this second embodiment also greatly improves assembly efficiency because the illuminating optical system 60 is assembled simply by adhering blocks one to the other. Therefore, reduction of production cost is achieved as described in connection with the first embodiment.

Figure 4:
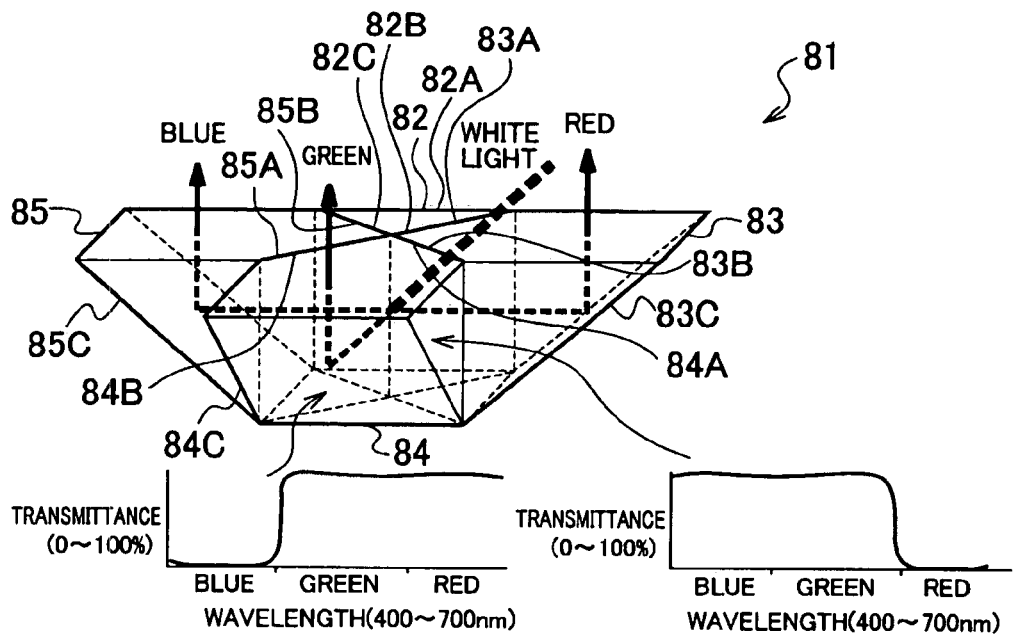
FIG. 4 is a perspective view of an illuminating optical system of the color image projecting device of a first modification.

In the above described first embodiment, although the illuminating optical system 32 is divided into the blocks having a single function of splitting the three colors of light and blocks having a single function of reflecting one of the colors of light toward the projection optical system 33, both functions, namely splitting and reflection, may be provided in a single block as shown in FIG. 4 which shows an illuminating optical system 81 including a first block 82, a second block 83, a third block 84, and a fourth block 85.

The first block 82 is provided with an input surface 82A for the white light from the light source, a red reflecting surface 82B for reflecting the red color component of the input light, and a blue reflecting surface 82C for reflecting the blue color component of the input light.

The second block 83 is provided with a blue reflecting surface 83A that is integral with the blue reflecting surface 82C of the first block 82, a red reflecting surface 83B that reflects the red color component of light, and a dichroic mirror 83C that outputs the reflected red color light to the projection optical system 33.

The third block 84 is provided with a red reflecting surface 84A that is integral with the red reflecting surface 83B of the second block 83, a blue reflecting surface 84B that reflects the blue color light, and a dichroic mirror 84C that outputs the input green color light to the projection optical system 33.

The fourth block 85 has a blue reflecting surface 85A integral with the blue reflecting surface 84B of the third block 84, a red reflecting surface 85B integral with the red reflecting surface 82B of the first block 82, and a dichroic mirror 85C that outputs the blue color light to the projection optical system 33.

This embodiment of FIG. 4 offers the same actions and effects as the first embodiment of the color image projecting device 31.

Figure 5:
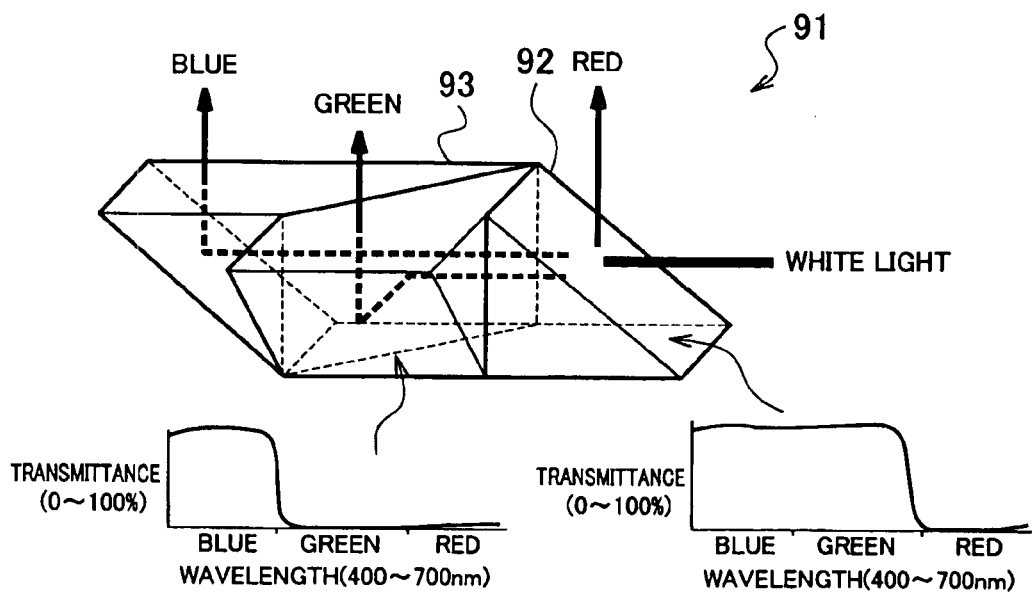
FIG. 5 is a perspective view of the illuminating optical system of the color image projecting device of a second modification.

Although the illuminating optical system 60 is divided into three blocks, namely 66, 67, and 68, alternatively the illuminating optical system may consist of two blocks as shown in FIG. 5, i.e., an illuminating optical system 91 including a first block 92 and a second block 93. A first block 92 integrates into one piece the first block 66 and the third block 68 of the second embodiment. The second block 93 is the same as the second block 67 of the second embodiment.

This embodiment of FIG. 5 also offers the same actions and effects as the first embodiment of the color image projecting device 31.

Figure 6:
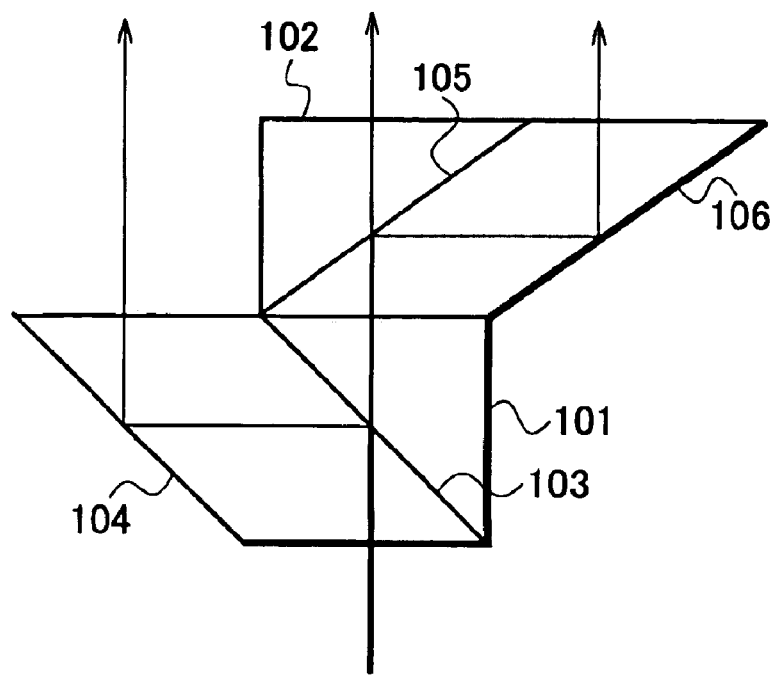
FIG. 6 is a perspective view of the illuminating optical system of the color image projecting device of a third modification.
Figure 7:
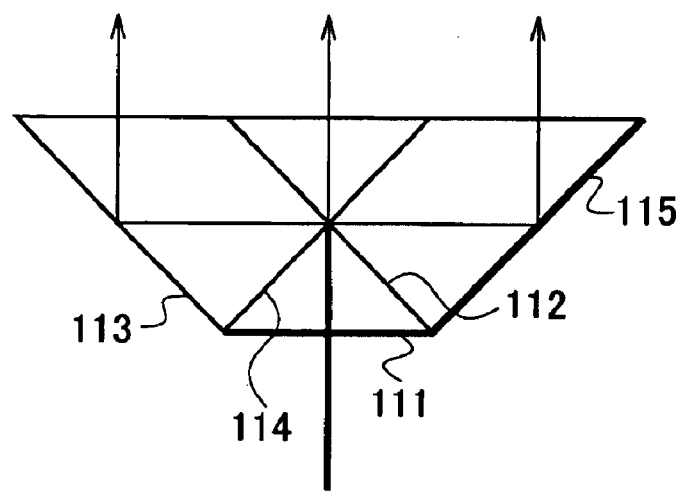
FIG. 7 is a perspective view of the illuminating optical system of the color image projecting device of a fourth modification.

Although three reflecting surfaces for reflecting three colors of light toward the projection optical system are provided in each of the previously described embodiments, when the input direction of the white light from the light source is directed toward the projection optical system 33 as shown in FIG. 6 and FIG. 7, only two reflecting surfaces need be provided.

In FIG. 6, the illuminating optical system comprises a first block 101 and a second block 102. The first block 101 has a dichroic mirror 103 that reflects the red color light toward a reflecting surface 104 which, in turn, reflects the red color light toward the projection optical system 33. The second block has a dichroic mirror 105 that reflects the blue color light toward a reflecting surface 106 which, in turn, reflects the blue color light toward the projection optical system. The green color light is transmitted through the dichroic mirrors 103 and 105 and propagated rectilinearly.

In FIG. 7, the illuminating optical system comprises a single block 111. The single block 111 is provided with a dichroic mirror 112 that reflects red color light to a reflecting surface 113 that, in turn, reflects the red color light toward the projection optical system 33. The single block 111 also has a dichroic mirror 114 that reflects blue color light onto a reflecting surface 115 that, in turn, reflects the blue color light toward the projection optical system. The green color light is transmitted through the dichroic mirrors 112 and 114 and thereby propagated rectilinearly.

The embodiments of FIGS. 6 and 7 have the same actions and effects as the previously described embodiments.

We claim:

1. An illuminating optical system comprising:
   a light source that emits white light including red, green, and blue colors; and
   a dividing-spectra block facing said light source and having at least:
      a first reflecting surface that is provided on an optical path from said light source and reflects one of said colors of light while transmitting remaining colors of light;
      a second reflecting surface for extraction that extracts light which is reflected off said first reflecting surface by reflection in a predetermined direction;

a third reflecting surface that is provided on said optical path from said light source and reflects another one of said three colors of light while transmitting a remaining color of light; and a fourth reflecting surface for extraction that extracts light which is reflected off said second reflecting surface by reflection in a predetermined direction;

wherein said each reflecting surface of said block comprises a dichroic mirror which reflects or transmits only one of said colors of light.

2. An illuminating optical system comprising:

a light source that emits white light including red, green, and blue colors;

a first block that has at least a first reflecting surface which reflects or transmits one of said colors of light from said light source in a predetermined direction while transmitting or reflecting remaining colors of light;

a second block in contact with said first block and having at least a second reflecting surface which reflects or transmits one of two colors of light transmitted through or reflected off said first reflecting surface in a predetermined direction while transmitting or reflecting a remaining color of light;

a third block in contact with said second block and having a third reflecting surface which reflects light transmitted through or reflected off said second reflecting surface of said second block in a predetermined direction; and wherein each of said first, second and third reflecting surfaces comprises a dichroic mirror which reflects or transmits only one of said colors of light.

3. An illuminating optical system comprising:

a light source that emits white light including red, green, and blue colors;

a first block that has at least a first reflecting surface which reflects or transmits one of said colors of light from said light source in a predetermined direction while transmitting or reflecting remaining colors of light;

a second block in contact with said first block and having at least a second reflecting surface which reflects or transmits one of two colors of light transmitted through or reflected off said first reflecting surface in a predetermined direction while transmitting or reflecting a remaining color of light; and wherein each of said first and second reflecting surfaces comprises a dichroic mirror which reflects or transmits only one of said colors of light.

4. An illuminating optical system comprising:

a light source that emits white light including red, green and blue colors;

a dividing-spectra block having a first reflecting surface that reflects one of said colors of light from said light source while transmitting remaining colors of light and a second reflecting surface that reflects another color while transmitting a remaining color of light, said first and second reflecting surfaces being located on the same optical path and dispersing said colors of light in three directions;

a red block in contact with a surface of said dividing-spectra block from which a red color of light is emitted, said red block having a third reflecting surface for extraction of said red color of light by reflection in a predetermined direction;

a green block in contact with a surface of said dividing-spectra block from which a green color of light is emitted, said green block having a fourth reflecting surface for extraction of said green color of light by reflection in a predetermined direction; and a blue block in contact with a surface of said dividing-spectra block from which a blue color of light is emitted, said blue block having a fifth reflecting surface for extraction of said blue color of light by reflection in a predetermined direction; and wherein each of said first, second, third, fourth and fifth reflecting surfaces comprises a dichroic mirror which reflects or transmits only one of said colors of light.

5. A color image projecting device comprising:

an illuminating optical system that outputs red, green, and blue colors of light by separating white light; and a projection optical system that forms a color projection image from said colors of light from said illuminating optical system; and wherein said illuminating optical system comprises:

a light source that emits said white light including said red, green, and blue colors;

a dividing-spectra block having a first reflecting surface that reflects one of said colors of light from said light source in one of left and right directions, while transmitting remaining colors of light and a second reflecting surface that reflects another color of light in the other of said left and right directions, while transmitting a remaining color of light, said first and second reflecting surfaces being located on the same optical path and dispersing said three colors of light in three directions, said three directions being forward, left and right;

a red block in contact with a surface of said dividing-spectra block from which a red color of light is emitted, said red block having a third reflecting surface for extraction which extracts said red color of light by reflection vertically;

a green block in contact with a surface of said dividing-spectra block from which a green color of light is emitted, said green block having a fourth reflecting surface for extraction of said green color of light by reflection in said vertical direction; and a blue block in contact with a surface of said dividing-spectra block from which a blue color of light is emitted, said blue block having a fifth reflecting surface for extraction of said blue color of light by reflection in a predetermined direction; and wherein said projection optical system comprises:

a red projection block facing said red block and forming a red color projection image by reflecting said red color of light from said red block toward a centrally located condensing block;

a green projection block facing said green block and forming a green color projection image by reflecting said green color of light from said green block toward the condensing block;

a blue projection block facing said blue block and forming a blue color projection image by reflecting said blue color of light from said blue block toward the condensing block; and wherein the condensing block faces said dividing-spectra block, is located centrally of said projection blocks, combines said red, green, and blue color projection images into a combined projection image and outputs the combined projection image;

wherein said illuminating optical system and said projection optical system are vertically stacked; and wherein each of said reflecting surfaces comprises a dichroic mirror which reflects or transmits only one of said red, green, and blue colors.

6. A color image projecting device comprising:

an illuminating optical system that outputs red, green, and blue colors of light by separating white light; and a projection optical system that forms a color projection image with said colors of light from said illuminating optical system; and wherein said illuminating optical system comprises:

a light source that emits said white light including red, green, and blue colors;

a first block that transmits a first color of said colors of light in a vertical direction while reflecting remaining colors of light horizontally and that reflects a second color of the remaining colors of light in a left or right direction while transmitting a third color of light;

a second block in contact with a surface from which said second color of light reflected by said first block in a left or right direction is emitted, said second block having a first reflecting surface for extraction of said color of light by reflection in a vertical direction the same as that in which said first color of light is reflected by said first block; and a third block in contact with a surface which emits said third color of light transmitted by said first block, said third block having a second reflecting surface for extraction of said color of light by reflection in a vertical direction the same as that in which said first color of light is reflected by said first block; and wherein said projection optical system comprises:

a first projection block facing a portion which transmits the first color of light from said first block and forming a projection image by reflecting said first color of light toward a centrally located condensing block;

a second projection block facing said second block and forming a projection image by reflecting said second color of light toward the condensing block;

a third projection block facing said third block and forming a projection image by reflecting said third color of light toward the condensing block; and wherein the condensing block is located at the center of the projection blocks, combines the projection images from the projection blocks, and outputs a single projection image with said colors combined; and wherein said illuminating optical system and said projection optical system are vertically stacked.

7. The color image projecting device according to claim 6, wherein said each of said reflecting surfaces comprises a dichroic mirror which reflects or transmits only one of said red, green, and blue colors of light.

* * * * *